G. F. KNIGHT & B. M. FRANK.
MACHINE FOR FORMING OUTER CASINGS OF PNEUMATIC TIRES.
APPLICATION FILED FEB. 9, 1916.
1,255,320.
Patented Feb. 5, 1918.
7 SHEETS—SHEET 1.
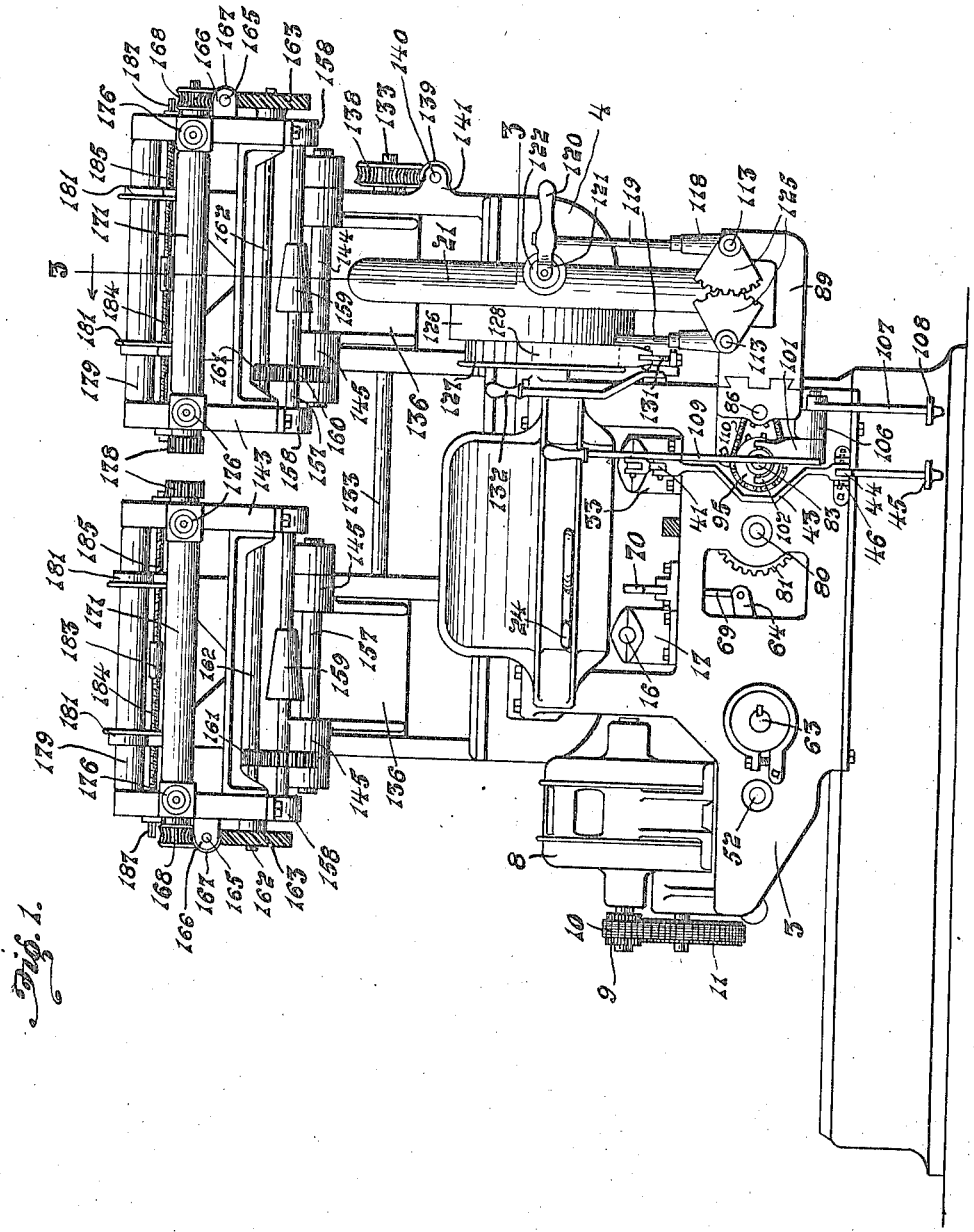

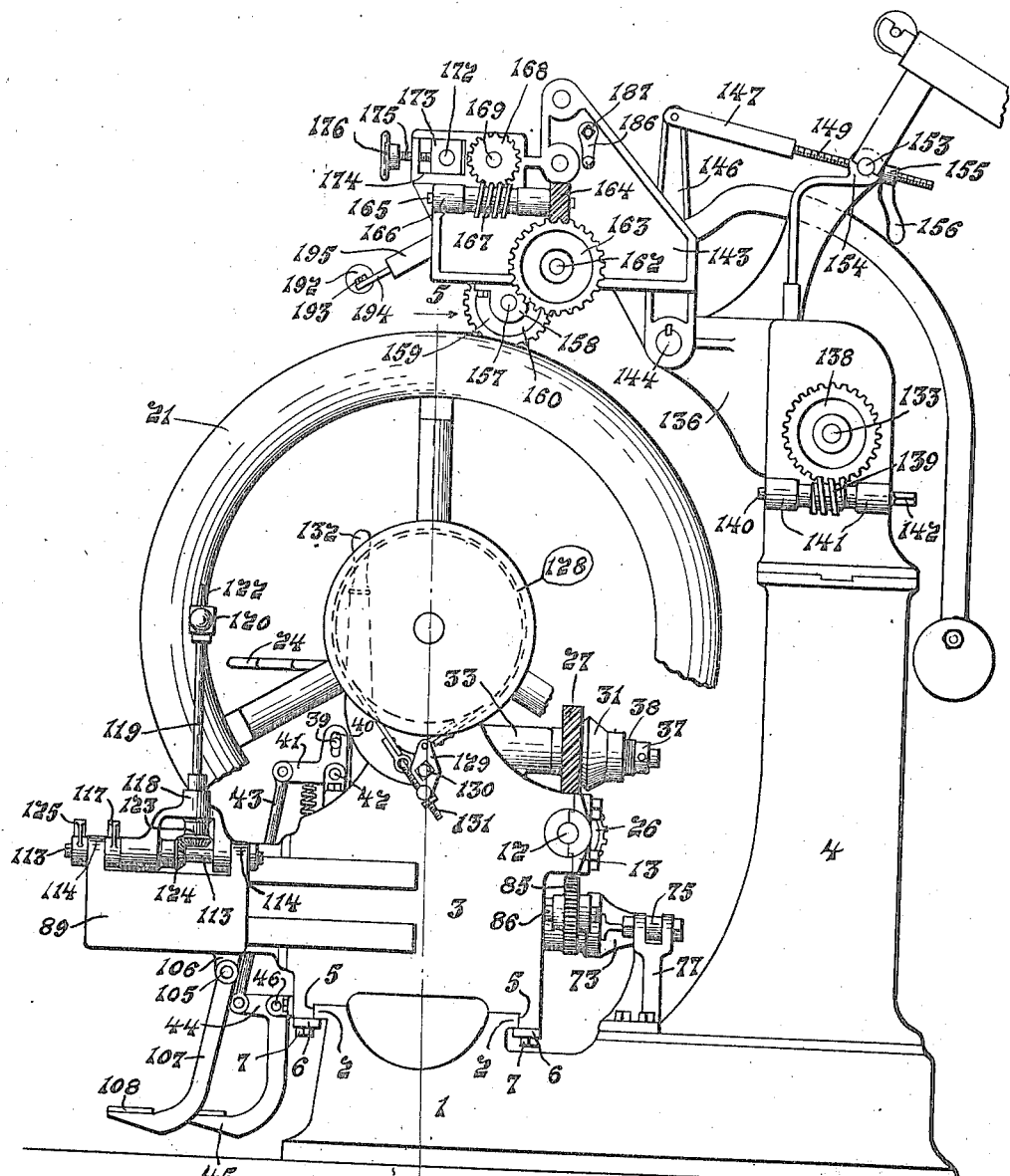

G. F. KNIGHT & B. M. FRANK.
MACHINE FOR FORMING OUTER CASINGS OF PNEUMATIC TIRES.
APPLICATION FILED FEB. 9, 1916.
1,255,320.
Patented Feb. 5, 1918.
7 SHEETS—SHEET 3.
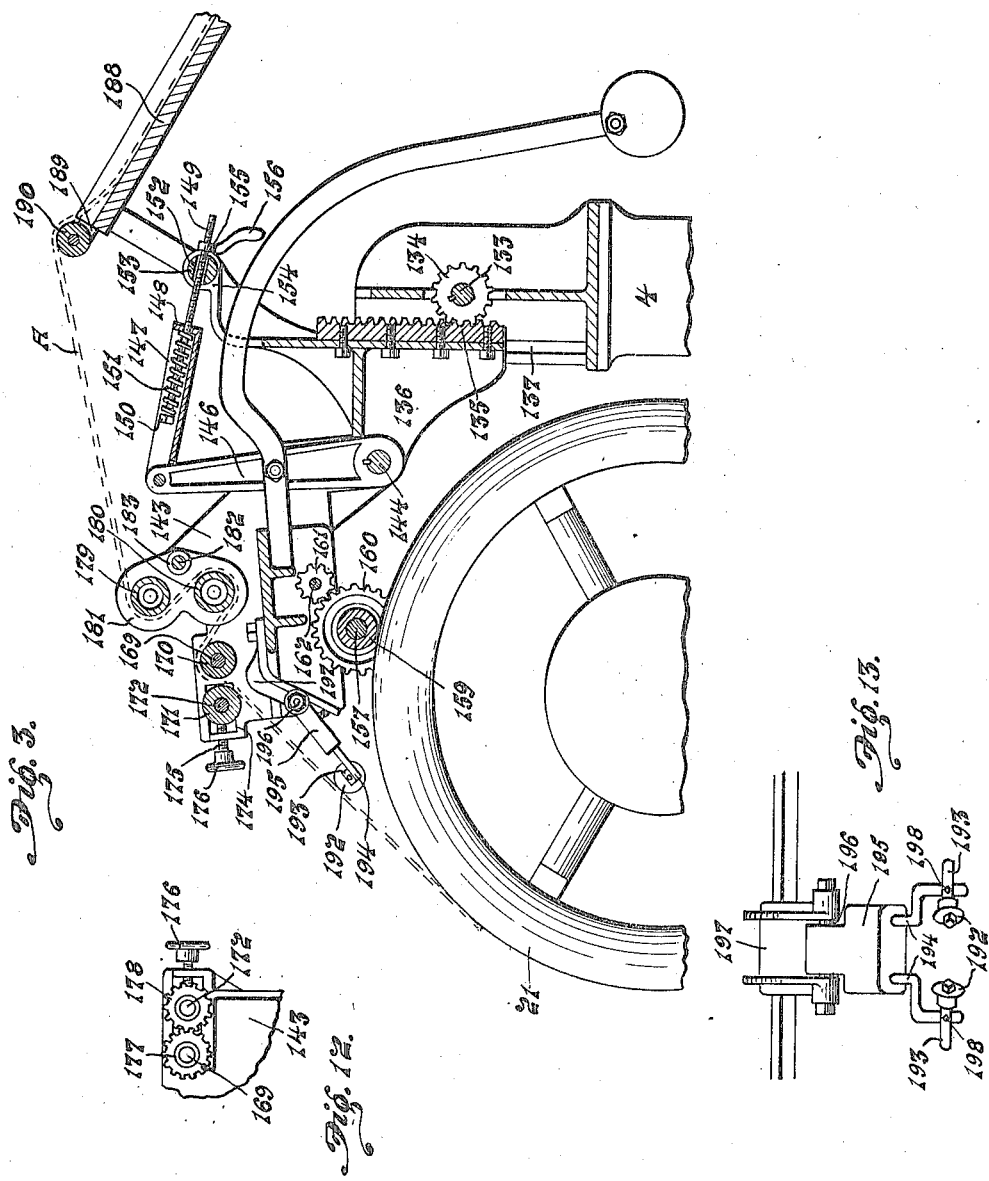

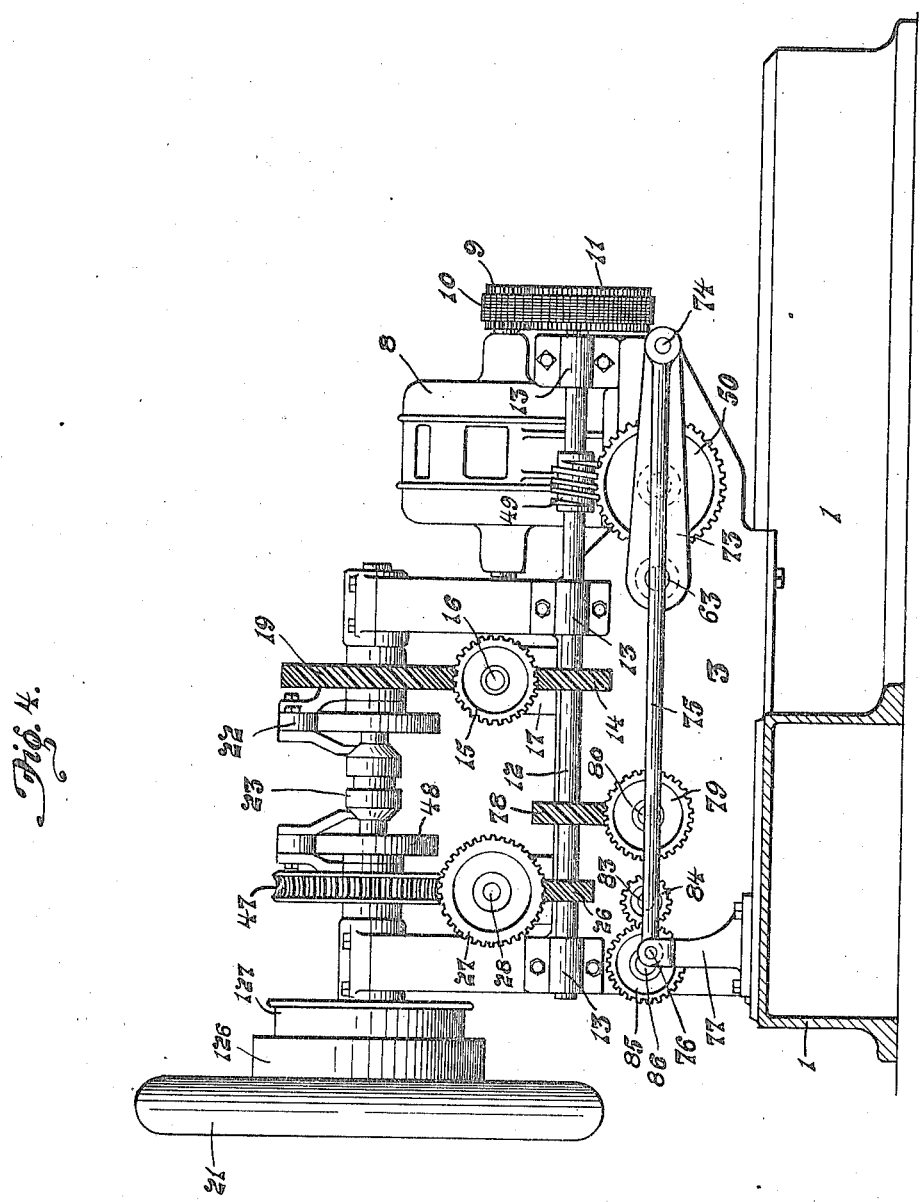

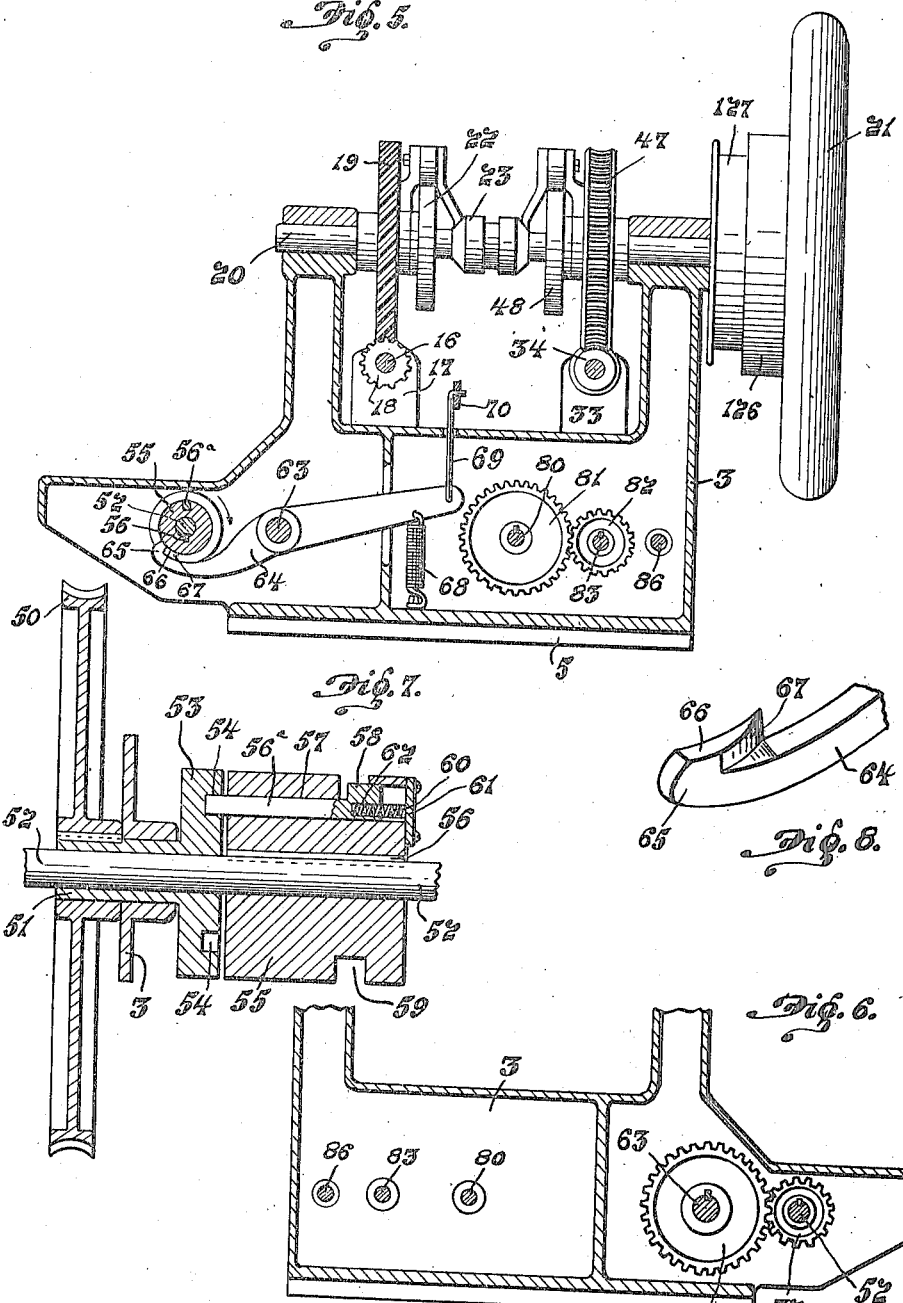

G. F. KNIGHT & B. M. FRANK.
MACHINE FOR FORMING OUTER CASINGS OF PNEUMATIC TIRES.
APPLICATION FILED FEB. 9, 1916.
1,255,320.
Patented Feb. 5, 1918.
7 SHEETS—SHEET 6.
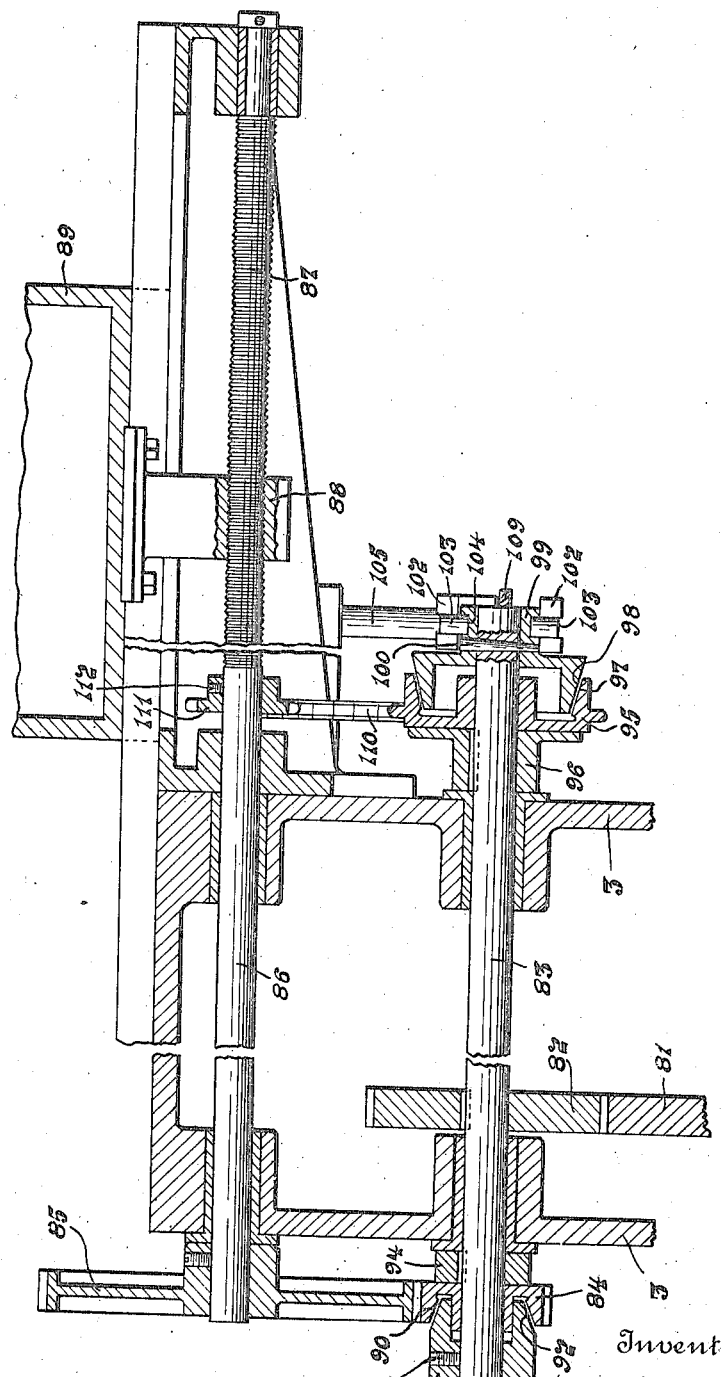

G. F. KNIGHT & B. M. FRANK.
MACHINE FOR FORMING OUTER CASINGS OF PNEUMATIC TIRES.
APPLICATION FILED FEB. 9, 1916.

1,255,320.

Patented Feb. 5, 1918.

Witness
Robert O. Karcher

Inventor
George F. Knight and
Burdette M. Frank.

By

Attorney

UNITED STATES PATENT OFFICE.

GEORGE F. KNIGHT AND BURDETTE M. FRANK, OF CANTON, OHIO; SAID FRANK ASSIGNOR TO SAID KNIGHT.

MACHINE FOR FORMING OUTER CASINGS OF PNEUMATIC TIRES.

1,255,320.　　　　　　　Specification of Letters Patent.　　　Patented Feb. 5, 1918.

Application filed February 9, 1916. Serial No. 77,313.

*To all whom it may concern:*

Be it known that we, GEORGE F. KNIGHT and BURDETTE M. FRANK, both citizens of the United States, both residing at Canton, in the county of Stark and State of Ohio, have invented a new and useful Machine for Forming Outer Casings of Pneumatic Tires, of which the following is a specification.

The present invention relates to machines for forming the outer casings of pneumatic tires such as are used upon automobiles and similar vehicles.

In the machines at present used for forming tire casings the canvas is carried upon a stock roll in a continuous strip, being fed upon the core and stretched and cut after each complete revolution of the core. In the devices such as are above referred to the tension on the fabric is caused by a friction brake on one of the rolls over which the fabric is passed and there is no way of determining the percentage of stretch given to the fabric by this method as weather conditions affect the tensile qualities of the canvas and thus with the same amount of tension the fabric will be stretched more upon some days than upon other days.

It is the object of the present invention to always stretch the canvas the same, regardless of the amount of tension required.

A further object is to provide a machine of this character into which are fed strips of canvas of sufficient length to make one revolution of the tire when they are stretched the proper amount.

A further object of this invention is to produce a machine by which the casings may be rapidly and efficiently manufactured.

A still further object of this invention is to provide a machine of the character referred to in which fabric of different widths is employed in the manufacture of a single case, the different widths of fabric being supplied to the form from different sources, means being provided for moving the form to each of said sources of supply.

With these objects in view the invention consists in the novel construction and arrangement of parts, hereinafter described, illustrated in the accompanying drawings, and particularly pointed out in the appended claims, it being understood that various changes in the form, proportions, size, and minor details of construction may be made within the scope of the appended claims, without departing from the spirit or sacrificing any of the advantages of the invention.

In the accompanying drawings:

Figure 1 is a front elevation of the machine.

Fig. 2 is a side elevation of the same.

Fig. 3 is a section on line 3—3, Fig. 1.

Fig. 4 is a rear elevation of a part of the mechanism designed for shifting the rotating form.

Fig. 5 is a section on line 5—5, Fig. 2.

Fig. 6 is a fragmentary section looking in the opposite direction from Fig. 5.

Fig. 7 is a sectional view of the clutch which controls the shifting of the rotary form.

Fig. 8 is a detail perspective view of the extremity of the cam lever which controls the clutch.

Fig. 9 is a sectional view of the mechanism which shifts the carriage upon which the stitching wheels are mounted.

Fig. 12 is a fragmentary view showing the gears which are provided upon the roller shafts.

Fig. 13 is a detail view of the stretching disks.

Similar numerals of reference indicate corresponding parts throughout the several figures of the drawings.

Figure 10:
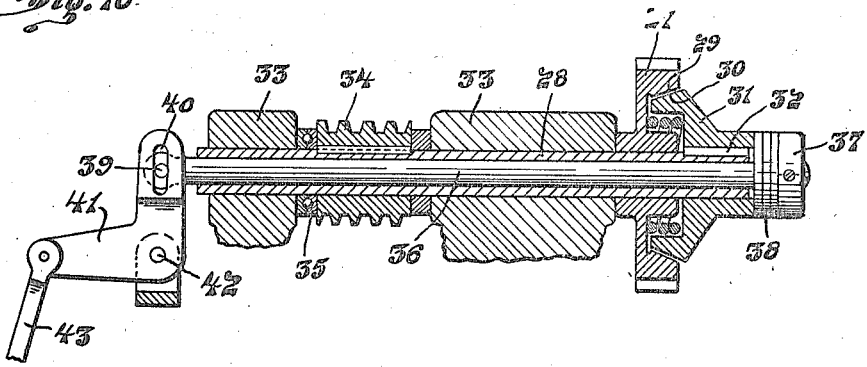
Fig. 10 is a sectional view of a portion of the mechanism for rotating the rotary form.
Figure 11:
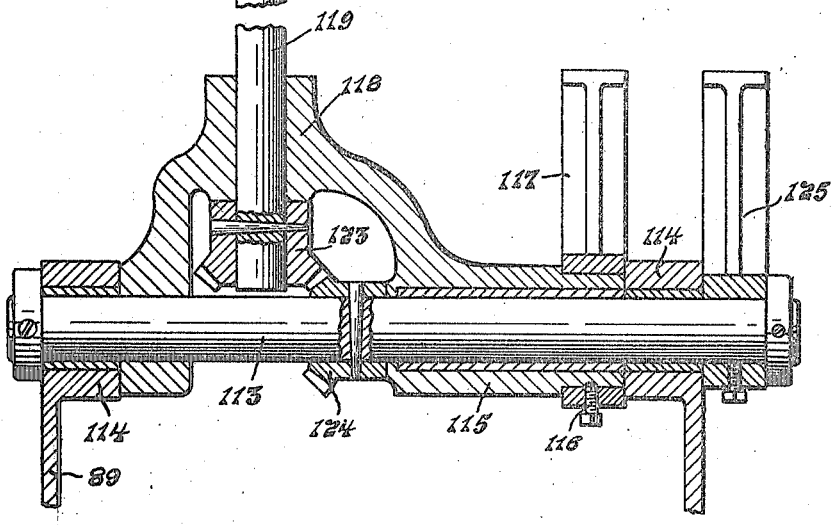
Fig. 11 is an enlarged sectional view of the stitching mechanism.

The numeral 1 represents a base preferably formed of cast iron and provided with tracks 2 upon which the carriage 3 is slidably mounted, said carriage carrying the rotating form and the mechanism for operating the same. The pedestal 4 upon which is mounted the mechanism for feeding the fabric to the form is stationarily mounted upon the base 1. A suitable groove 5 is provided in the lower face of the carriage 3, said groove being of a width to receive the tracks 2, strips 6 being connected to the under face of the carriage by bolts 7 or their equivalents, the edges of said strips extending beneath the lower edges of the tracks 2 for the purpose of preventing the carriage from being displaced during the operation of the machine.

A motor 8, preferably an electric motor, is shown mounted upon the carriage 3 and is provided with a sprocket 9, a silent drive chain 10, preferably connecting said sprocket with the relatively larger sprocket 11 which is mounted upon the main drive shaft 12, said shaft being journaled in suitable bearings 13. A spiral gear 14 is fixedly mounted upon the shaft 12 and meshes with a spiral gear 15 which is mounted upon the shaft 16, which is located at right angles to the shaft 12, said shaft 16 being journaled in suitable bearings 17 mounted upon the carriage 3. A spiral pinion 18 is mounted upon the shaft 16 and meshes with a relatively large spiral gear 19 which is loosely mounted upon the shaft 20, upon which shaft is fixedly mounted the rotating form 21. A clutch member 22 is slidably mounted upon the shaft 20 and arranged to rotate with said shaft, said clutch member being of any usual and well known construction and adapted to be thrown into engagement with the spiral gear 19 by means of the double conical member 23, which member is arranged to be slidably mounted upon the shaft in the usual manner, a lever 24 being provided for operating said cone member.

A spiral pinion 26 is fixedly mounted upon the shaft and meshes with the spiral gear 27, which is loosely mounted upon the hollow shaft 28. The gear 27 is provided with an internal tapered clutch face 29 adapted to receive the conical clutch face 30 of the clutch member 31, which is slidably mounted upon the shaft 28, a feather key 32 being provided for the purpose of preventing rotation of the clutch member with relation to the shaft. The hollow shaft 28 is journaled in suitable bearings 33 provided upon the carriage 3 and a worm 34 is fixedly mounted upon said hollow shaft, a ball race 35 being provided between one extremity of said worm and the adjacent bearing.

A rod 36 is slidably mounted within the hollow shaft 28, said rod being provided at its inner extremity with a collar 37 between which collar and the clutch member 31 is located a ball race 38 of usual construction. The outer extremity of the rod is provided with a pin 39, said pin being received within the elongated slots 40 formed in the bifurcated portion of the bell crank lever 41, said bell crank lever being pivoted at 42 upon the carriage 3. A link 43 is pivotally connected to the bell crank lever, said link being also pivotally connected to the arm 44 which is provided upon the treadle 45, said treadle being pivoted at 46 upon the carriage 3.

A worm wheel 47 is loosely mounted upon the shaft 20 and meshes with the worm 34, a clutch member 48 being slidably mounted upon the shaft 20 and arranged to rotate therewith, said clutch member being arranged to be thrown into engagement with the worm wheel 47 by means of the slidable cone member 23. A worm 49 is carried by the shaft 12, said worm meshing with a worm wheel 50, which is fixedly mounted upon a sleeve 51, said sleeve being rotatably mounted upon the shaft 52, which shaft is journaled in suitable bearings formed in the carriage 3. A disk portion 53 is formed integral with the sleeve 51 and provided at intervals around its face with sockets 54 by means of which the clutch 55, which is fixed upon the shaft 52, by means of a key 56 or the like, is connected to the disk 53 causing the shaft 52 to be rotated by means of the worm wheel 50. The clutch 55 comprises a cylinder fixed upon the shaft 52 as described, a bolt 56ª being slidably mounted within a suitable aperture 57 formed through the cylinder and parallel to the shaft 52, said bolt being provided with a head 58 which is adapted to normally lie within the annular groove 59 formed in the clutch, a spring 60 bearing against the end plate 61 which is attached to the cylindrical body of the clutch, said spring being located within a socket 62 formed in the head of the bolt 56.

A shaft 63 is journaled in suitable bearings in the carriage 3 and loosely mounted upon said shaft is a lever 64, the free extremity 65 of said lever being provided with the cam portion 66 having an inclined face 67, said cam portion being adapted to be normally located within the peripheral groove 59 formed in the cylindrical body of the clutch 55 and arranged to normally bear against the head 58 of the bolt 56 for the purpose of holding said bolt out of engagement with the disk 53. An expansion spring 68 is connected to the other extremity of the lever 64 and to the bottom wall of the carriage 3 and a link 69 connects said lever to an operating handle 70.

A gear 71 is fixedly mounted upon the shaft 63 and meshes with a pinion 72 fixed upon the shaft 52, the pinion 72 being one-half the size of the gear 71, thus causing the shaft 63 to make one-half of a revolution with each complete revolution of the shaft 52. Fixedly mounted upon the outer extremity of the shaft 63 is an arm 73, said arm being preferably connected, at its outer end at 74, to a link 75, said link being pivotally connected, at its other end, at 76 to a bifurcated bearing 77 which is securely mounted upon the base 1.

A spiral gear 78 is mounted upon the shaft 12 and meshes with a spiral gear 79 mounted upon the shaft 80, said shaft being journaled in suitable bearings, through the carriage, and located at right angles to the plane of the shaft 12. A gear 81 is fixedly mounted upon the shaft 80, within the carriage 3, and meshes with a pinion 82 which is fixedly mounted upon the shaft 83, said shaft being provided upon its outer extremity with a pinion 84, loosely mounted thereon, and meshing with a gear 85, said gear being mounted upon a shaft 86, which is journaled in suitable bearings provided in the carriage. The shaft 86 is provided with a screw threaded portion 87 which engages the internally screw threaded lug 88 formed upon the sliding table 89, upon which table is mounted the stitching mechanism.

The gear 84 is provided with a frusto-conical socket 90 and a friction clutch 91 provided with a frusto-conical portion 92 adapted to enter the socket in the pinion 84 is fixedly connected to the shaft 83 by means of a set screw 93 or the like. A collar 94 is provided upon the shaft 83 for the purpose of spacing the pinion 84 from the side wall of the carriage 3. A sprocket wheel 95 is loosely mounted upon the shaft 83 and spaced from the adjacent side of the carriage 3 by means of a collar 96, said sprocket wheel being provided with a frusto-conical socket 97 adapted to receive the frusto-conical portion 98 of the friction clutch member 99, said clutch member being fixedly connected to the shaft 83 by means of a pin 100 or its equivalent. A rock arm 101 is provided with a bifurcated portion 102 having pins 103 which are located within the peripheral groove 104 formed in the clutch member 99, said rock arm being fixedly mounted upon the rock shaft 105, which rock shaft is journaled in a bearing 106 carried upon the frame of the carriage 3, a downwardly depending rock arm 107 being fixedly connected to said rock shaft and provided at its lower extremity with a treadle 108. A hand lever 109 is fixedly connected to the rock arm 101. A sprocket chain 110 connects the sprocket wheel 95 with a comparatively smaller sprocket wheel 111 which is fixedly mounted upon the shaft 86, by means of a set screw 112 or its equivalent.

A pair of parallel, horizontally disposed shafts 113 are journaled in suitable bearings 114 provided upon the sliding table 89 and upon each of said shafts is loosely mounted a sleeve 115 upon each of said sleeves being fixedly mounted by means of a set screw 116 a gear segment 117, said segments meshing with each other. A short sleeve 118 is disposed at right angles to each of the sleeves 115 and formed integral therewith, and journaled within each of said sleeves 118 is a shaft 119, a handle 120 being fixed upon the upper extremity of each of said shafts, said handle being provided with a bifurcated portion 121, within which is rotatably mounted a stitching wheel 122. A beveled gear 123 is fixedly mounted upon the lower extremity of each of the shafts 119 and meshes with a beveled gear 124 fixedly mounted upon the adjacent shaft 113, a gear segment 125 being fixedly mounted upon the outer extremity of each of the shafts 113, said gear segments meshing with each other.

The hub 126 of the rotatable form 21 is provided with a peripheral groove 127 which is arranged to receive the band-brake 128, the extremity of said band-brake being connected to the extremities of the lever 129, which is pivoted at 130, upon the frame of said carriage, one extremity of said band-brake being provided with an adjusting screw 131. An operating handle 132 is fixedly connected to the lever 129 for the purpose of rocking said lever in order to apply the brake to the rotating form when desired.

A pair of pedestals 4 are mounted upon the base 1 and journaled within said pedestals is a shaft 133 upon which is mounted a pinion 134 meshing with a pair of rack bars 135 provided upon the sliding brackets 136 which are mounted for vertical reciprocation within suitable guide ways 137 in the pedestals 4. A worm wheel 138 is provided upon one extremity of the shaft 133 and meshes with a worm 139, said worm being carried by the shaft 140, which is journaled in bearings 141, located upon one pedestal 4, one extremity of said shaft being squared as indicated at 142 for the reception of a wrench or similar instrument. By rotating the worm 139 by means of a wrench applied to the squared portion of the shaft 140 the worm wheel 138 and shaft 133 will be rotated and through the pinion 134 and rack bar 135 and bracket 136 may be adjusted vertically. The bracket 136 will thus be locked in any desired vertical adjustment, and although the worm wheel 138 may be rotated by means of the worm 139 it is well known that the worm cannot be rotated by means of the worm wheel, the worm thus acting as a lock for the worm wheel.

Two frames 143 are fixedly connected to the rock shaft 144, said rock shaft being journaled in suitable bearings 145 provided upon the bracket 136. Two rock arms 146 are keyed to the shaft 144 and pivotally connected to the upper extremity of each is a casing 147, the free extremity of which is closed as indicated at 148 being provided with an aperture through which is slidably located an elongated bolt 149 provided with a head 150 interposed between which and the wall 148 is an expansion spring 151. The screw threaded extremity of the bolt 149 is slidably located through an aperture 152 in the shaft 153, said shaft being journaled in suitable bearings 154 provided upon the bracket 136. A nut 155 provided with a hand lever 156 is mounted upon the screw threaded extremity of the bolt 149 for the purpose of adjusting the tension upon the spring 151.

A shaft 157 is journaled in the forward lower portion of the pivoted frame 143, in suitable bearings 158, said shaft being provided with a friction cone pulley 159 arranged to be brought into frictional contact with the annular form 21 as will be hereinafter described. A gear 160 is mounted upon the shaft 157 and meshes with a pinion 161 mounted upon the counter-shaft 162 which is journaled in suitable bearings in the frame 143. A relatively large spiral gear 163 is mounted upon one extremity of the shaft 162 and meshes with a relatively small spiral gear 164 mounted upon the short shaft 165, said shaft being journaled in suitable bearings 166 located upon the frame 143. A worm 167 is provided upon the shaft 165 and meshes with a worm gear 168 provided upon the shaft 169 of the roller 170, said shaft 169 being journaled in the frame 143. A similar roller 171 is mounted upon a shaft 172 which is journaled in adjustable bearings 173 slidably mounted within guide ways 174 provided in the frame 143, said slidable bearings being adjusted by means of screws 175, which are provided with hand wheels 176. A pinion 177 mounted upon the shaft 169 meshes with a pinion 178 mounted upon the shaft 172.

Upper and lower rolls 179 and 180 respectively are mounted for rotation within each frame 143 and slidably mounted upon said rolls and arranged to be moved toward or away from each other in unison as will be hereinafter described is a pair of guide plates 181. A shaft 182 is journaled within each frame 143 and provided at a point intermediate its extremities with the enlarged portion 183 arranged to act as a stop block to limit the movement of the guide plates 181 toward each other. The shaft 182 is provided with the left and right hand screw threaded portions 184 and 185 respectively, one of said screw threaded portions engaging each of the guide plates 81 for the purpose of moving said guide plates in unison, in opposite directions, as said shaft is rotated. A crank 186 is provided upon the squared extremity 187 of the shaft for the purpose of rotating the shaft.

A table 188 is supported in any suitable manner upon the bracket 136 and is provided at its forward extremity with bearings 189 within which is journaled a roller 190 over which the strips of rubber coated canvas used in the manufacture of the casings, designated by the letter A, are passed as shown in Fig. 3.

It has been found that as the power driven annular form draws the fabric under tension through the co-acting pressure rolls, the fabric becomes creased longitudinally. In order to overcome this difficulty the stretching disks or wheels 192 are provided, said disks being rotatably mounted upon the arms 193 said arms being connected to the off-set portions of the rods 194, which are carried by the pivoted block 195, pivoted at 196 to the casting 197, said casting being rigidly attached to the pivoted frame as shown. The stretching wheels or disks are set at the proper angle to laterally stretch and smooth the fabric which is drawn about said rollers in its passage from the co-acting pressure rolls, thus removing longitudinal creases which may be formed in the fabric. The arms 193 may be adjusted to any desired position by tightening the bolts 198.

During the time that the motor is in operation the shaft 12 is being continually rotated and through the spiral gears 14 and 15 the shaft 16 is being continually rotated, the spiral pinion 18 upon said shaft rotating the spiral gear 19 loosely upon the shaft 20. The rotation of the shaft 12 causes the spiral gear 27, by means of the spiral pinion 26 to rotate loosely upon the shaft 36. When it is desired to rotate the form 21 at slow speed for the purpose of winding the layers of fabric thereon, the lever 24 is operated in a direction to bring the cone member 23 into engagement with the clutch member 48 coupling said clutch member to the worm wheel 47, causing the shaft 20 to be rotated with the rotation of the worm wheel. At the same time the treadle 45 is depressed, bringing the clutch member 31 into engagement with the gear 27, causing the hollow shaft 28 to be rotated with said gear, the worm 34 upon said hollow shaft rotating the worm wheel 47. The worm wheel 50 is being continually operated by the worm 49 during the operation of the motor and when it is desired to move the carriage 3 in order to move the form 21 the lever 70 is operated in a direction to move the cam portion 66 of the lever 64 out of engagement with the peripheral groove 59 in the clutch 55, thus releasing the bolt 56 and allowing said bolt to enter the nearest socket 54 in the disk portion 53 of the sleeve 51, which carries the worm wheel 50, thus coupling the shaft 52 and the worm wheel 50. The shaft 52 is thus rotated with the worm wheel 50 and through the pinion 72 and gear 71 rotates the shaft 63 upon which the arm 73 is mounted. The shaft 52 will make one complete revolution and will then come to a full stop as the inclined face 67 upon the cam portion of the lever 64 again engages the head 58 of the bolt 56, withdrawing said bolt from the socket 54 and uncoupling the worm wheel 50 from the shaft 52. As the gear 71 is twice the size of the pinion 72 the shaft 63 will make one-half of a revolution during each complete revolution of the shaft 52 and through the arm 73 and link 75, the carriage 3 will be moved the proper distance upon the base 1 to bring the form 21 into position to receive the next strip of fabric.

During the operation of the motor the shaft 80 is being continually rotated through the spiral gears 78 and 79. The gear 81 upon said shaft thus, through the gear 82 upon the shaft 83, continually rotates said last named shaft. By depressing the treadle 45 the clutch 92 is thrown into engagement with the pinion 84 causing said pinion to rotate with the shaft 83 and through the gear 85 rotating the screw threaded shaft 86 in a direction to move the table 89, moving the stitching mechanism, toward the rotating form. By operating the lever 109 the clutch 98 is thrown into engagement with the sprocket 95, causing said sprocket to rotate with the shaft and through the chain 110 and sprocket 111 rotating the screw threaded shaft in the opposite direction to move the stitching mechanism away from the rotating form.

Suppose the parts would be in the normal position as shown in Fig. 2 of the drawings. The strips of rubber coated canvas cut the proper length for successive layers upon the casing are placed in the proper order upon the tables 188, the upward extremity of the uppermost strip indicated by the numeral A being passed over the rollers 190 and 179 around the roller 180 and between the rollers 170 and 171 as indicated in Fig. 3 the end of the strips being attached in the usual manner to the form 21. The form 21 is then rotated at slow speed. It will be seen from an inspection of Fig. 3 that as the strip of canvas is pulled down and attached to the form 21 the pivoted frame 143 is rocked downwardly bringing the friction cone pulley 159 into engagement with the periphery of the form 21, thus causing the form and the mechanism driven thereby to be operated in unison with the movement of the form. The stretching of the canvas strip takes place between the point where said strip is shown attached to the form in Fig. 3 and the point where it passes between the rollers 170 and 171, and the speed with which the strip passes through said rollers is governed by the speed of the rotation of said rollers. As the rollers 170 and 171 are rotated through the mechanism driven by the friction cone pulley the speed of which in turn is governed by the speed of rotation of the form 21, it will be seen that the tension placed upon the canvas strip depends upon the relative speeds of the form 21 and the rollers 170 and 171 and as the rotation between the form and the rollers remains uniform the tension placed upon the strips will be such that each strip will be stretched alike regardless of weather conditions or of the amount of tension required for each strip. By adjusting the friction cone pulley 159 laterally upon the shaft 157 it will be seen that the tension may be varied.

Although the drawings and above specification disclose the best mode in which we have contemplated embodying our invention we desire to be not limited to the details of such disclosure, for, in the further practical application of our invention, many changes in form and construction may be made, as circumstances require or experience suggests, without departing from the spirit of the invention, within the scope of the appended claims.

We claim:

1. A machine of the character described, comprising the combination of a pair of co-acting rollers between which a sheet of fabric is arranged to be passed, a power driven annular form for drawing the sheet fabric from said rollers, a worm arranged to rotate said rollers and means interposed between said worm and said annular form for operating said worm, said worm preventing the rotation of said rollers when said form is stationary.

2. A machine of the character described, comprising a frame, a power driven annular form mounted in said frame, a pivoted frame mounted adjacent said annular form, a friction pulley mounted in said pivoted frame, a pair of co-acting rollers, between which a sheet of fabric is arranged to be passed, a worm arranged to drive said rollers, means interposed between said friction pulley and said worm for operating said worm, means for normally holding said pivoted frame in a position to hold said friction pulley out of engagement with said form, said friction pulley arranged to engage said form when the sheet fabric is attached to said form.

3. A machine of the character described, comprising a frame, a power driven annular form mounted in said frame, a pivoted frame mounted adjacent said annular form, a friction pulley mounted in said pivoted frame, a pair of co-acting rollers, between which a sheet of fabric is arranged to be passed, pinions mounted upon said rollers, a worm gear mounted upon said rollers, a worm mounted upon said pivoted frame and meshing with said worm gear, a spiral pinion mounted upon said worm, a spiral gear meshing with said spiral pinion, means interposed between said friction pulley and said spiral gear for driving said spiral gear, means for normally holding said pivoted frame in a position to hold said friction pulley out of engagement with said form, said friction pulley arranged to engage said form when the sheet fabric is attached to said form.

4. A machine of the character described comprising a frame, a power driven annular form mounted in said frame, a pivoted frame mounted adjacent said annular form, a shaft mounted in said pivoted frame, a friction cone pulley adjustably mounted upon said shaft, a pair of co-acting rolls between which a sheet of fabric is arranged to be passed, means interposed between said friction cone pulley and said rolls for rotating said rolls, means for normally holding said pivoted frame in a position to hold said friction cone pulley out of engagement with said form, said friction cone pulley arranged to engage said form when the sheet fabric is attached to said form.

5. A machine of the character described, comprising the combination of a pair of co-acting pressure rolls between which a sheet of fabric is arranged to be passed, a power driven annular form for drawing the sheet of fabric from said co-acting pressure rolls, a friction pulley engaging with the power driven annular form, a worm gear and worm arranged to drive said co-acting pressure rolls, means interposed between said friction pulley and said worm for driving said worm, said worm preventing the power driven form from drawing the fabric through the co-acting pressure roll except at such predetermined speed as the friction pulley and interposed mechanism will transmit, thereby stretching the fabric the desired amount, said worm preventing the fabric from being drawn through said co-acting pressure rolls when the annular form is stationary.

6. A machine of the character described, comprising the combination of a plurality of sheet fabric supplies, a power driven annular form for drawing the sheet fabric from either source of supply, a roller interposed between each source of supply and said annular form, means controlled by the rotation of said annular form for rotating either of said rollers and means for shifting said form from either of said fabric supplies to the other supply.

In testimony that we claim the above, we have hereunto subscribed our names.

GEORGE F. KNIGHT.
BURDETTE M. FRANK.